United States Patent
Gonzalez Bautista et al.

(10) Patent No.: US 12,497,044 B2
(45) Date of Patent: Dec. 16, 2025

(54) CONTROL SYSTEM AND METHOD ADJUSTED TO PERCEPTION

(71) Applicant: RENAULT S.A.S, Boulogne Billancourt (FR)

(72) Inventors: David Gonzalez Bautista, Saint Cyr l'école (FR); Imane Mahtout, Guyancourt (FR); Vicente Milanes, Guyancourt (FR); Francisco Martin Navas Matos, Vanves (FR)

(73) Assignee: AMPERE S.A.S., Boulogne Billancourt (FR)

( * ) Notice: Subject to any disclaimer, the term of this patent is extended or adjusted under 35 U.S.C. 154(b) by 99 days.

(21) Appl. No.: 18/253,312

(22) PCT Filed: Nov. 15, 2021

(86) PCT No.: PCT/EP2021/081695
§ 371 (c)(1),
(2) Date: May 17, 2023

(87) PCT Pub. No.: WO2022/106359
PCT Pub. Date: May 27, 2022

(65) Prior Publication Data
US 2024/0010200 A1   Jan. 11, 2024

(30) Foreign Application Priority Data
Nov. 19, 2020   (FR) ...................... 20 11893

(51) Int. Cl.
*B60W 30/16* (2020.01)
*B60W 50/00* (2006.01)
*B60W 50/06* (2006.01)

(52) U.S. Cl.
CPC ............ *B60W 30/16* (2013.01); *B60W 50/06* (2013.01); *B60W 2050/0052* (2013.01);
(Continued)

(58) Field of Classification Search
CPC .... B60W 30/16; B60W 30/143; B60W 30/14; B60W 40/114; B60W 2050/0002;
(Continued)

(56) References Cited

U.S. PATENT DOCUMENTS 11,801,867 B2 * 10/2023 Murahashi ............ B60W 30/09
2012/0116665 A1 * 5/2012 Aoki ................... B60T 8/17558
701/301
(Continued)

FOREIGN PATENT DOCUMENTS

| FR | 3 023 816 A1 | 1/2016 | |
| GB | 2574257 A * | 12/2019 | ............ B60W 40/10 |
| WO | WO 2020/089230 A1 | 5/2020 | |

OTHER PUBLICATIONS

International Search Report issued Feb. 23, 2022 in PCT/EP2021/081695, filed on Nov. 15, 2021 citing documents 1-4 & 15-17 therein, 2 pages.
(Continued)

*Primary Examiner* — Brandon Z Willis
(74) *Attorney, Agent, or Firm* — Oblon, McClelland, Maier & Neustadt, L.L.P.

(57) ABSTRACT

A system controls a vehicle. The vehicle implements at least one control application using a variable measured by at least one sensor of a perception system installed in the vehicle. The control system includes an adaptive controller to dynamically activate one or more elementary controllers of a set of elementary controllers including at least two elementary controllers, each elementary controller can apply a control function of a vehicle parameter acting on actuators of the vehicle, the control functions being separate, based on a precision indicator of the perception system determined according to a real-time value of the variable.

11 Claims, 6 Drawing Sheets

(52) U.S. Cl.
CPC .............. *B60W 2050/0059* (2013.01); *B60W 2420/403* (2013.01); *B60W 2420/408* (2024.01); *B60W 2520/14* (2013.01); *B60W 2554/802* (2020.02); *B60W 2556/25* (2020.02); *B60W 2556/35* (2020.02)

(58) Field of Classification Search
CPC . B60W 2050/0013; B60W 2050/0014; B60W 2050/0027; B60W 2050/0059; B60W 2050/0095; B60W 2050/0052; B60W 2050/0056; B60W 2050/0215; B60W 2050/0295; B60W 2050/0297; B60W 50/06; B60W 50/0205; B60W 50/035; B60W 2420/403; B60W 2420/408; B60W 2520/14; B60W 2520/10; B60W 2554/802; B60W 2556/25; B60W 2556/35; G01S 7/292; G01S 13/931; G01S 2013/9321; B60Y 2400/3015; B60Y 2400/3017; B60Y 2400/303

See application file for complete search history.

(56) References Cited

U.S. PATENT DOCUMENTS

| | | | |
|---|---|---|---|
| 2018/0022354 A1 | 1/2018 | Akatsuka et al. | |
| 2019/0256093 A1* | 8/2019 | Horii | B60W 30/16 |
| 2020/0025575 A1* | 1/2020 | Weissman | G05D 1/0257 |
| 2020/0125111 A1 | 4/2020 | Takizawa | |
| 2020/0225317 A1* | 7/2020 | Chen | G01S 7/417 |
| 2022/0004782 A1 | 1/2022 | Matthes | |
| 2023/0242103 A1* | 8/2023 | Miyazaki | B60W 30/09 |
| | | | 701/301 |
| 2024/0346816 A1* | 10/2024 | Iandola | B60W 40/02 |

OTHER PUBLICATIONS

French Preliminary Search Report Issued Jul. 14, 2021 in French Application 20 11893 filed on Nov. 19, 2020 (with English Translation of Categories of Cited Documents), citing documents 1-3 & 15-17 therein, 3 pages.

* cited by examiner

CONTROL SYSTEM AND METHOD ADJUSTED TO PERCEPTION

TECHNICAL FIELD

The invention relates generally to control systems for controlling mobile objects and in particular to a control system and method for controlling a vehicle.

Vehicle automation has seen rapid expansion in recent years in order to improve safety and optimize driving for vehicles.

An automated vehicle, such as for example an autonomous connected vehicle, conventionally uses a perception system comprising a set of sensors that are arranged on the vehicle in order to detect environmental information, which is used by a control device in order to control the vehicle, such as for example the distance-regulating radar system ACC (adaptive cruise control) used to regulate the distance between vehicles.

The performance of a perception system is closely related to the distance of a detected obstacle. The farther away the obstacle, the noisier the information associated with the detected object.

An automated vehicle (referred to as an "ego" vehicle) is able, for example, to use a camera-type sensor in order to detect a vehicle that is in front of it on the road on which it is travelling. The control device can implement object detection and tracking algorithms in order to provide control for the vehicle.

In vehicles that use such control devices, two parameters generally affect the performance of a perception system:
The type of object detection and tracking algorithm implemented in the vehicle, which provides more or less precise measurement, and
The physical limitations of the sensor used for detection.

For a camera-type sensor, for example, the physical limitations may be related to the number of pixels, which limit the image resolution so that the farther away an object is from the ego vehicle, the lower the precision of detection. The result of this is less precise measurement, which impairs the performance of the ego vehicle. The response of the vehicle to such a measurement is also affected. This is because existing solutions do not allow there to be a single control device, such as for example a vehicle tracking system using a camera, that is capable of managing all distances of vehicles detected in the environment of the ego vehicle.

Figure 1:
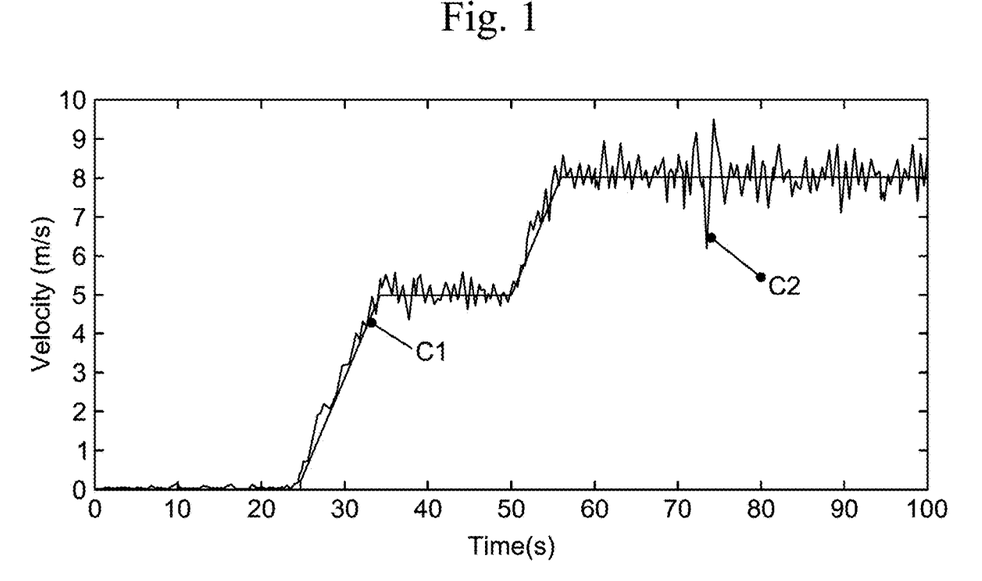
FIG. 1 shows a graph showing the velocity of two vehicles following one another according to the prior art.

FIG. 1 is a conventional graph showing the velocity of a vehicle in front 3, the velocity being measured for a ground reality (line C1 showing the real velocity of the vehicle in front), and the velocity measured by a perception system installed in the ego vehicle (curve C2 showing the velocity of the vehicle in front estimated by the perception system 2). In this example, the velocity of the vehicle in front is controlled in order to obtain a given response from the ego vehicle. In the graph in FIG. 1, four consecutive velocity changes can be seen. When an ego vehicle equipped with the installed perception system follows a vehicle in front at a distance, this distance depends on the velocity such that the higher the velocity, the greater the inter-vehicle distance. Moreover, the higher the velocity, the greater the imprecision of the perception system, which impairs measurements.

There are solutions to rectify the imprecision of the perception system. A known solution involves filtering the perception signal at the output of the perception system. However, such solutions cannot be used to guarantee stability for the control response. Moreover, although they can be used to smooth the output of the perception system, it is not possible to establish a link between the performance of the entire system and the filtering.

A solution was proposed in CN101417655B to minimize the error over the inter-vehicle distance. CN101417655B describes an adaptive cruise control (ACC) in which the vehicle is coordinated with the multi-objective tracking performance of the ACC system. The inter-vehicle distance error is minimized by taking account of the fuel consumption of the vehicle and maximum and minimum acceleration/deceleration parameters accepted by the driver. However, this solution does not take account of noise reduction capabilities, thus reducing the operating range in which the sensors are able to detect their environment in an optimum manner.

U.S. Pat. No. 9,266,533B2 uses learning systems in order to simulate human response in an ACC system. However, this solution does not take account of noise reduction capabilities, and so performance is conditional on situations in which the perception system has little noise.

A known solution to address the problem of noise in the perception system involves using a communication device as described in U.S. Pat. No. 8,352,112B2. However, such devices are expensive, involve signal losses and do not take account of noise in the design of the controller.

U.S. Ser. No. 10/310,509B1 describes a system that is capable of detecting the impairment of a lidar-type sensor by evaluating newly acquired laser spots and comparing them with previously stored spots. Depending on the comparison, a signal is provided that indicates whether or not the sensor is impaired. Such information is not used for real-time adaptation of the behavior of the automated vehicle vis-à-vis possible noise in measurements, however.

US2019/0189104 A1 discloses an ACC system to reduce the noise caused by the braking system of the vehicle by using a braking model and the possible noise levels that the actuator may generate with each velocity change. This noise is removed in order to improve the response of the ACC system to braking. However, this solution only takes account of noise identified in the braking actuators, not noise related to the perception system, which is greater and affects the ACC system to a greater extent. Such a solution is therefore not adapted for handling disturbances that come from the perception system.

US2013/0197736 A1 describes a behavioral system adapted to perception uncertainties. Such a solution considers the sensor noise in various measurements taken in order to classify objects detected on the road. An uncertainty calculation is performed in order to prescribe various vehicle maneuvers, such as for example vehicle movement, in order to avoid obstacles so as to better determine their dimensions and provide better classification and estimation of state variables. However, in this solution, the noise does not change the performance of the vehicle (control response) and the noise is not considered in lateral or longitudinal actions.

There is thus a need for a control method and device that are capable of adapting the response of the vehicle according to the level of precision of the perception system.

GENERAL DEFINITION OF THE INVENTION

The invention improves the situation by proposing a control system for controlling a vehicle, the vehicle implementing at least one control application using a magnitude measured by at least one sensor of a perception system installed on the vehicle. Advantageously, the system comprises an adaptive controller configured to dynamically activate one or more elementary controllers of a set of elementary controllers comprising at least two elementary controllers, each elementary controller being configured to apply a control function for controlling a parameter of the vehicle by acting on actuators of the vehicle, the control functions being separate, based on a precision indicator of the perception system determined according to a real-time value of the magnitude.

In one embodiment, the control system also comprises a corrector configured to generate a permutation signal, the value of which varies according to the precision indicator.

The value of the precision signal can vary between a first value representing an optimum level of precision of the perception system and a second value representing a minimum level of precision of the perception system.

In particular, the first value may be equal to one and the second value is equal to zero.

In one embodiment, the elementary controllers can comprise a first elementary controller and a second elementary controller, and if the precision indicator has the first value then the permutation signal can be updated to a first signal value, the first elementary controller being completely activated in response to the update of the permutation signal.

In one embodiment, if the precision indicator of the perception system has the second value then the permutation signal can be updated to a second signal value, the second elementary controller being completely activated in response to the update of the permutation signal.

The magnitude may be a magnitude from among the velocity of the vehicle, the inter-vehicle distance between the vehicle and a head vehicle, and the yaw velocity of the vehicle.

In one embodiment, the first controller may be a vehicle tracking controller and the second controller may be a noise rejection controller.

In certain embodiments, the control applications can use a plurality of magnitudes measured by at least two sensors of the perception system, the control device comprising a switch for selecting a magnitude from among the magnitudes, the adaptive controller being applied to the selected magnitude by using the activated elementary controllers.

A control method for controlling a vehicle is also proposed that is carried out in the vehicle, the vehicle implementing at least one control application using a magnitude measured by at least one sensor of a perception system installed on the vehicle. Advantageously, the method comprises the following steps involving:

selecting at least one elementary controller from among a set of elementary controllers comprising at least two elementary controllers, each elementary controller being configured to apply a control function for controlling a parameter of the vehicle by acting on actuators of the vehicle, the control functions being separate, based on a precision indicator of the perception system determined according to a real-time value of the magnitude; and
activating said at least one selected elementary controller.

The embodiments of the invention thus provide a control device capable of adapting its response to the capabilities of the perception system and of changing the response of the vehicle according to the level of precision of the perception system. The capabilities of the automotive driving assistance system (for example ADAS) or of the control system in an autonomous vehicle can thus be improved.

By controlling the performance limitations that can be generated between the perception system and the control system of the vehicle, the performance of the vehicle can thus be improved.

The embodiments of the invention can be used in particular to adapt the response of the vehicle to the perception performance for the whole distance between the vehicle and the detected object so as to optimize the performance of the vehicle by using its maximum capabilities whatever the situation of the vehicle.

BRIEF DESCRIPTION OF THE FIGURES

Other features, details and advantages of the invention will become apparent on reading the description provided with reference to the appended drawings, which are given by way of example and in which, respectively.

DETAILED DESCRIPTION

Figure 2:
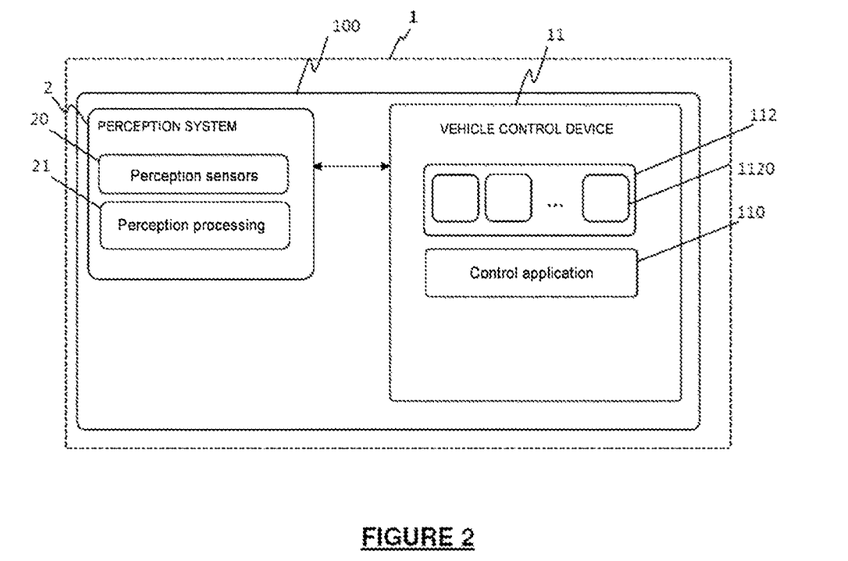
FIG. 2 shows a control system installed in a vehicle according to some embodiments.

FIG. 2 shows a control system 100 installed in a vehicle 1 (referred to as the "ego" vehicle). The control system 100 comprises a control device 11 and a perception system 2 installed on the vehicle. The control system 11 may be a driving assistance system (such as an ADAS or AD system). The perception system 2 comprises one or more sensors 20 arranged in the vehicle 1 in order to measure magnitudes relating to the vehicle and/or to the environment of the vehicle. The control system 100 uses the information provided by the perception system 2 of the vehicle 1 in order to control the operation of the vehicle 1.

The control device 11 can be configured to assist the driver in performing complex driving operations or maneuvers, detecting and avoiding dangerous situations and/or limiting the impact of such situations on the vehicle 1. The ego vehicle 1 can detect the environment outside the vehicle by virtue of the data received from the sensors 20 of the perception system 2, on the basis of which it is able to build and update an internal model of the configuration of the environment.

The control device 11 implements at least one control application 110 using a magnitude G measured by at least one sensor 20 of the perception system 2. The control system 100 is advantageously configured to adapt the response of the vehicle 1 according to the level of precision of the perception system 2.

The control application 110 may be, for example, a vehicle tracking application configured to control the velocity of the vehicle 1 according to the velocity of the vehicle, the velocity of a vehicle in front and/or the velocity of a vehicle behind.

The control application 110 may be, for example, a velocity-regulating application ACC. An ACC-type application can use a radar system using radar sensors 20 in order to estimate the velocity difference between two vehicles following one another, the radar being arranged on the front of the ego vehicle 1, for example.

The control device 11 advantageously comprises an adaptive controller 112 configured to dynamically activate one or more elementary controllers from among a set of elementary controllers 1120 comprising at least two elementary controllers. Each elementary controller 1120 is configured to apply a control function for controlling a parameter by acting on actuators of the vehicle (not shown). The control functions of the various elementary controllers 1120 may be separate. The control function depends on a precision indicator of the perception system determined according to a real-time value of the measured magnitude G used by the control application 110.

The sensors 20 of the perception system 2 can include various types of sensors, such as for example, and without limitation, one or more lidar (laser detection and ranging) sensors, one or more radar systems, one or more cameras, which may be cameras operating in the visible range and/or cameras operating in the infrared range, one or more ultrasonic sensors, one or more steering wheel angle sensors, one or more wheel speed sensors, one or more brake pressure sensors, one or more yaw velocity and transverse acceleration sensors, etc.

The perception system 2 carries out vehicle perception processing 21 in order to establish spatial and temporal relationships between the vehicle and static and mobile obstacles in the environment. This perception processing 21 can comprise in particular simultaneous localization and mapping (SLAM) methods involving modelling static parts, and/or detection and tracking of moving objects (DATMO) methods involving modelling mobile parts in the environment.

The perception system 2 carries out vehicle perception processing 21 in order to establish spatial and temporal relationships between the vehicle and static and mobile obstacles in the environment. This perception processing 21 can comprise in particular simultaneous localization and mapping (SLAM) methods involving modelling static parts, and/or detection and tracking of moving objects (DATMO) methods involving modelling mobile parts in the environment.

The perception system 2 can also implement fusion algorithms in order to process the information from the various sensors 20 and implement one or more perception operations, such as for example tracking and predicting the progression of the environment of the ego vehicle 1 over time, generating a map in which the ego vehicle 1 is positioned, locating the ego vehicle on a map, etc.

Multisensor fusion algorithms can combine information from the various sensors 20 in order to determine one or more magnitudes, of such magnitudes as to then be used by the perception system 2 in order to perform perception methods such as for example detecting and/or tracking obstacles, and/or determining the global localization of the ego vehicle 1 that uses merging of data from a positioning system, such as for example a GNSS (acronym for "Global Navigation Satellite System") satellite positioning system.

The perception system 2 can be associated with perception parameters that can be defined offline by calibrating the performance of the perception system 2 according to the installed sensors 20.

Figure 3:
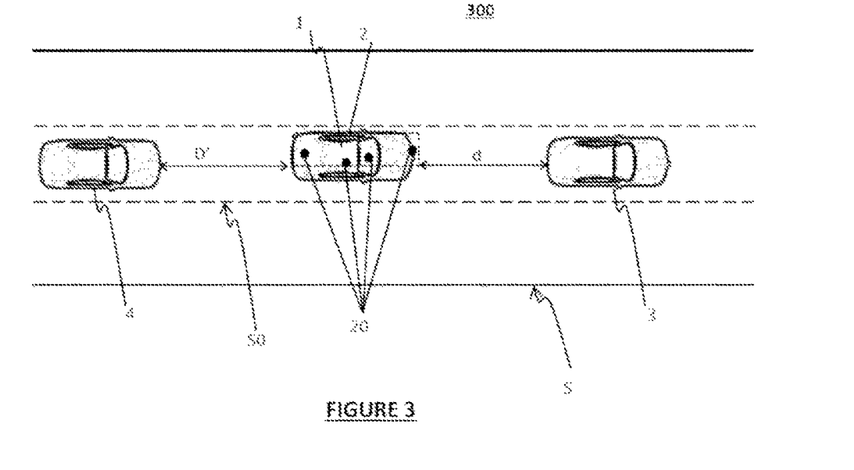
FIG. 3 shows an example of a traffic environment adapted to carrying out a control application for controlling a vehicle, according to certain embodiments.

FIG. 3 shows an example of a traffic environment 300 adapted to carrying out a control application for controlling a vehicle 110 implementing a vehicle detection and tracking algorithm.

The ego vehicle 1 travels on a road 5 comprising three traffic lanes 50. The vehicle 1 is fitted with a set of sensors 20 belonging to the perception system 2.

In the environment 300 in FIG. 3, the ego vehicle 1 is followed by a vehicle 4 in the lane 50 (referred to as the 'follower' vehicle). The ego vehicle 1 is also preceded by another vehicle 3 in the lane 50 (referred to as the "head vehicle" or "vehicle in front").

The ego vehicle 1, the follower vehicle 4 and/or the head vehicle 3 may advantageously be autonomous connected vehicles.

The control application 110 can thus control the velocity v of the vehicle 1 according to the velocity of the vehicle in front 3 and/or the velocity of the vehicle behind 4, and/or the gap d between the ego vehicle 1 and the vehicle in front 3 and/or the gap between the ego vehicle 1 and the vehicle behind 4.

A control application 110 of vehicle tracking application type is able, for example, to control the driving of the ego vehicle 1 by comparing the gap d with a minimum inter-vehicle distance (safety gap), and/or comparing the inter-vehicle time, defined as being equal to the ratio between the gap d and the velocity v of the ego vehicle 1, with a minimum inter-vehicle time (also called the "reference time"). The control application 110 can also regulate the relative velocity between the ego vehicle 1 and the vehicle in front 3 in order to keep it at substantially zero. A control application implementing vehicle tracking can also apply a control law in order to keep the inter-vehicle distance (ego/front) at a target value. The gaps can follow a reference model defined in relation to a predefined collision zone.

The inter-vehicle distance can, for example, be measured by means of a LIDAR-type sensor 20 (laser telemetry), or by using two cameras installed on either side of the windshield of the vehicle.

The velocity of the ego vehicle 1 can, for example, be determined by using an odometer-type sensor.

The longitudinal and lateral accelerations of the vehicle 1 can, for example, be determined by using an inertial measurement unit.

In some embodiments, the yaw, roll and pitch velocities of the vehicle 1 can be determined using gyroscopes.

In one embodiment, the magnitude G used by the control application 110 may be a magnitude chosen from among the velocity of the vehicle, the inter-vehicle distance between the ego vehicle 1 and the head vehicle 3, and the yaw velocity of the ego vehicle 1.

Figure 4:
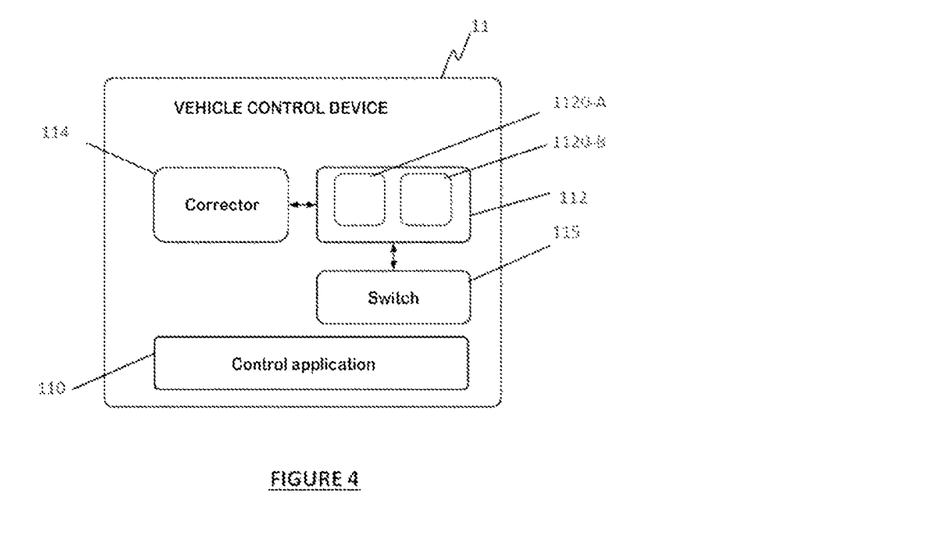
FIG. 4 shows the architecture of a control device implemented in a vehicle in order to control the driving of a vehicle, according to certain embodiments.

FIG. 4 shows the architecture of a control device 110 implemented in a vehicle 1 in order to control the driving of a vehicle, according to certain embodiments.

In one embodiment, the control device 11 also comprises a corrector 114 configured to generate a permutation signal γ, the value of which varies according to the precision indicator.

In one embodiment, the selected elementary controllers comprise a first elementary controller 1120-A and a second elementary controller 1120-B, at least one of the elementary controllers being activated according to the value of the precision indicator.

In one embodiment, if the precision indicator has a first value representing an optimum perception precision then the permutation signal is updated by the controller 11 to a first signal value and the first elementary controller 1120-A is completely activated in response to the update of the permutation signal.

Otherwise, if the precision indicator of the perception system has a second value representing imprecise perception then the permutation signal is updated to a second signal value by the controller 114 and the second elementary controller 1120-B is completely activated in response to the update of the permutation signal.

In one embodiment, the first controller 1120-A (also denoted by 'CD1') is a vehicle tracking controller and the second controller 1120-B is a noise rejection controller (also denoted by 'CD2'). The noise rejection controller is a controller configured to reject any noise having a frequency exceeding the bandwidth specified for the control system, including perception noise rejection.

In one embodiment, the control application 110 uses a plurality of N magnitudes $G_1, G_2, \ldots, G_N$ measured by at least two sensors 20 of the perception system 2. The control device 11 can then comprise a switch 115 in order to select a magnitude from among the N magnitudes $G_1, G_2, \ldots, G_N$, the adaptive controller 112 being applied to the selected magnitude by using the activated elementary controllers 1120.

Figure 5:
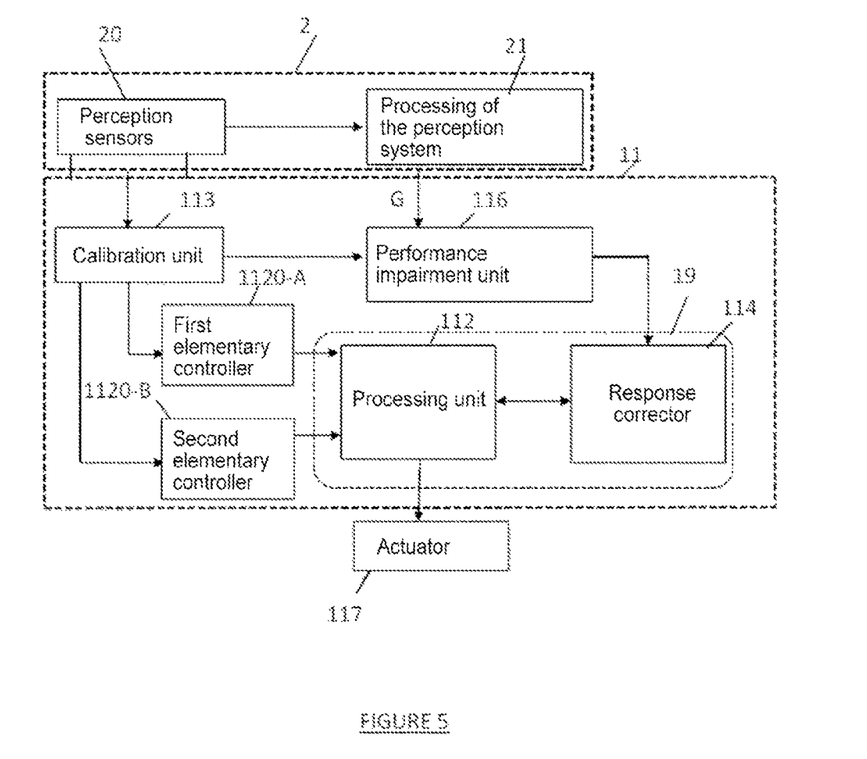
FIG. 5 shows a control system, according to certain embodiments of the invention.

FIG. 5 shows a control system 100, according to certain embodiments of the invention. In the example in FIG. 5, two elementary controllers 1120-A and 1120-B are used.

In such embodiments, the control device 11 can comprise a calibration unit 113 in order to calibrate the perception parameters. The calibration unit 113 can use a lookup table associating with each object distance a velocity of the vehicle in front 3 and an imprecision parameter representing the level of imprecision of a given measured magnitude G. The magnitude associated with the imprecision parameter may be, for example, a dynamics magnitude relating to the vehicle such as the velocity, the distance, the yaw velocity of the vehicle, etc. The lookup table (also called the "calibration table") may be, for example, a three-dimensional (3D) table.

Offline calibration of the vehicle can be used to define a set of design parameters specific to the performance of the vehicle. Thus, the control system 100 can use a level of imprecision specified at the time of the design of the performance of the vehicle 1.

In the example in FIG. 5, the first elementary controller 1120-A is a standard production system elementary controller 1120-A and the second elementary controller 1120-B is an elementary controller adapted to the control application 110.

Thus, in this exemplary embodiment, the adaptive controller 112 can activate the standard production system elementary controller 1120-A and/or the elementary controller adapted to the control application 1120-B according to the precision indicator.

For example, it is assumed that the control device 11 comprises a control application 110 controlling velocity changes between two values, for example between 0 and 10 m/s, and that the imprecision of the perception system 2 is similar to that shown in FIG. 1. The ego vehicle 1 equipped with the installed perception system 20 follows the vehicle in front of it 3 at a distance that depends on the velocity. When the velocity increases, the inter-vehicle distance also increases. Moreover, the higher the velocity, the greater the imprecision of the perception system may be. By using an adaptive controller 112 according to the embodiments, which is capable of activating the first or the second elementary controller 1120-B according to the precision indicator, the impact of such imprecision of the perception system on the performance of the vehicle can be advantageously minimized.

At its input, the control device 11 uses the perception magnitude G obtained in real time from the perception system 20, on which the control application 110 depends. For example, in the example in which the control application 110 controls velocity changes between two values, the input perception magnitude G may be the velocity of the vehicle in front in real time. The perception magnitude G can be transmitted to a performance impairment unit 116 configured to determine a state of the installed performance system. The output of the performance impairment unit 116 and the output of the elementary controllers 1120 can then be applied to a real-time vehicle performance adapter 19 configured to apply adaptive control in real time via actuator 117.

The real-time vehicle performance adapter 19 can comprise a processing unit adapted to perception 112 that is configured to fusion the two output data items from the elementary controllers 1120-A and 1120-B, which provides fusioned control data, into a single stable structure comprising the fusioned control data. The real-time vehicle performance adapter 19 can also comprise a response corrector 114 configured to adapt the performance of the vehicle 1 according to the fusioned control data.

The control device 11 according to the embodiments of the invention can thus be used to dynamically adapt the response of the vehicle to the impairment of the perception, by maximizing the performance of the vehicle vis-à-vis the precision of the perception while maintaining stability.

The control device 11 according to the embodiments of the invention is configured to constantly progress between the different elementary controllers 1120, comprising, in the example, the two elementary controllers 1120-A ($C_1$) and 1120-B ($C_2$), each elementary controller being defined according to a specific control design criterion.

In particular, in one exemplary embodiment, the first elementary controller $C_1$ (1120-A) can be configured to comply with maximum tracking performance CD1, while the second elementary controller $C_2$ (1120-B) can be configured to comply with maximum perception noise rejection CD2.

In one embodiment, the response corrector 114 can be configured to generate a permutation signal γ, the value of which can vary between zero (0) and one (1) according to the precision indicator, which represents the level of precision of the perception in real time, the precision indicator being determined by the adaptive controller 112. In one embodiment, the precision indicator can take a value between two extreme values comprising a first extreme value, indicating an optimum level of precision (precise perception), and a second extreme value, indicating an impaired level of precision (imprecise perception).

In one embodiment, when it is determined that the perception magnitude G (which may, for example, be the velocity of the ego vehicle, the inter-vehicle distance, the yaw velocity of the ego vehicle, etc.) has a noiseless value and that the precision indicator of the perception system 2 has the first extreme value indicating an optimum perception precision, the permutation signal γ can be set to the value zero (γ=0) and the first elementary controller $C_1$ (1120-A) is completely activated.

In one embodiment, it can be determined whether the perception magnitude has a noisy or noiseless value according to the velocity of the vehicle and the gap: the higher the velocity, the noisier the signals. As a variant, it can be determined whether the perception magnitude has a noisy or noiseless value by using the precision indicator relating to perception.

In other variants still, it is possible to use methods that allow the signals to be analyzed in terms of noise estimation.

The precision indicator can take values that change continuously over time. They can be represented by a quality value. Thus, the evaluation carried out by the performance impairment unit 116 can comprise determining the level of noise present in the signals, in real time and continuously. The possible values of the precision indicator can depend on the level of noise present in such signals.

When it is determined that the precision indicator of the perception system 2 has the second extreme value indicating imprecise perception, the permutation signal γ can be set to the value one (γ=1), and the second elementary controller $C_2$ (1120-B) can be completely activated.

The value of the precision indicator may be binary or non-binary. In one exemplary embodiment, the two extreme values of the precision indicator comprising the first value representing precise perception and the second value representing imprecise perception may be binary, the two values then being linearly interpolated in order to provide intermediate values.

The permutation signal γ can gradually progress between the two extreme values of the permutation signal (γ=0 and γ=1) according to the values of the perception precision indicator. Thus, the permutation signal γ can be set to the value between 0 and 1 according to the value of the precision indicator between the two extreme values. The first elementary controller $C_1$ (1120-A) and the second elementary controller $C_2$ (1120-B) can then be partially activated according to the value of the perception signal.

Thus, the controller of the vehicle 112 can adapt to the actual operating conditions in real time.

It is worth noting that the elementary controllers C1 and C2 (1120-A and 1120-B) can be more generally configured according to predefined control criteria. In the example considered above, the two elementary controllers C1 and C2 are chosen so that the desired precision performance guarantees precise tracking vis-à-vis noise rejection. The control criteria may also be contradictory, which is not possible with a conventional single controller.

Figure 6:
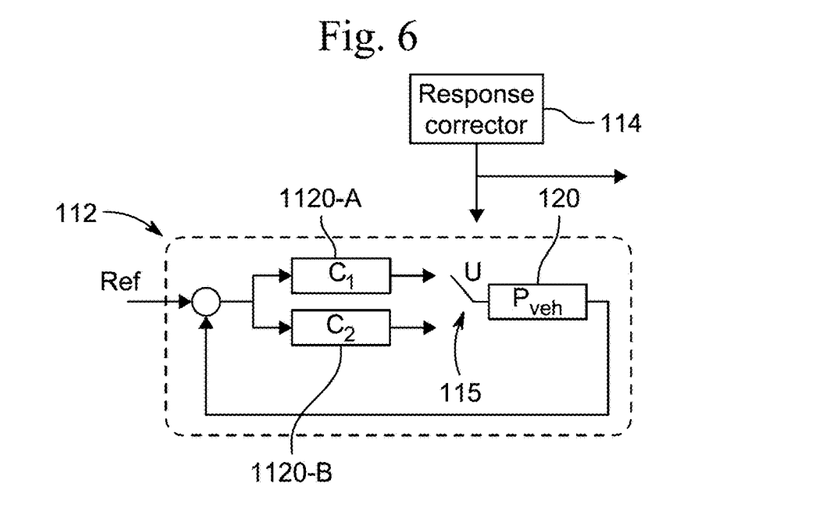
FIG. 6 shows an example of realization of the adaptive controller in the form of a circuit carrying out closed-loop control, according to certain embodiments.
Figure 7:
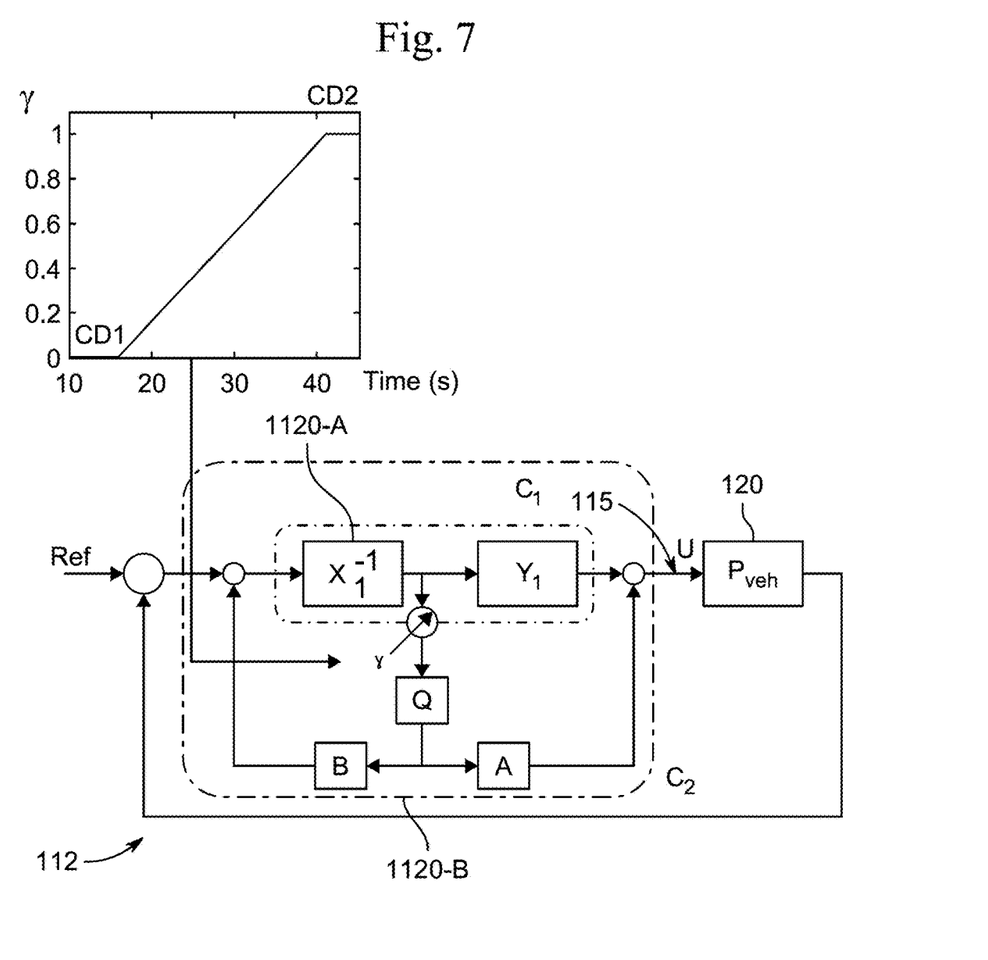
FIG. 7 shows an example of realization of the adaptive controller in the form of a circuit carrying out closed-loop control, according to certain embodiments.

FIGS. 6 and 7 show examples of realization of the adaptive controller 112 in the form of a circuit carrying out closed-loop control, according to certain embodiments.

FIG. 6 shows an example of implementation of the adaptive controller 112, according to one embodiment. In the example in FIG. 6, the adaptive controller 112 is implemented on the basis of a structure parameterized by a filter Q, allowing changeover from the elementary controller C1 to the elementary controller C2 in a stable manner. Such parameterization allows stable switching between the elementary controllers 1120 (1120-A and 1120-B in the example), carried out by the switch 11, by using the permutation signal γ, which represents a scalar factor.

In the embodiment shown in FIG. 6, the elementary controllers 1120 comprise two elementary controllers C1 (1120-A) and C2 (1120-B). The two elementary controllers C1 (1120-A) and C2 (1120-B) are advantageously configured so that:

each elementary controller C1 or C2 can independently stabilize the closed loop with a vehicle model represented by a parameter $P_{veh}$ (120);

the closed-loop response for each elementary controller includes any unstable pole cancellation (the control structure used is realized in order to avoid unstable configurations even in the case of switching in the controllers).

In this embodiment, the two elementary controllers C1 or C2 have the same number of inputs and outputs. More specifically, each controller has an input corresponding to the output of the vehicle model 120 and an output that can be applied to the input of the vehicle model 120 if it is selected by the switch 115.

In FIGS. 6 and 7, the elementary controllers C1 and C2 and the vehicle model $P_{veh}$ are shown using a state representation modelling the adaptive controller 112 in a dynamic form using state variables relating to the system.

In the parameterized control structure in FIG. 6, the adaptive controller 112 is represented by the switch U (115) and the vehicle model $P_{veh}$ (120).

Referring to FIG. 7, the elementary controllers $C_1$ (102) and $C_2$ (103) and the vehicle model $P_{veh}$ are factorized in order to produce a matrix of stable transfer functions.

The notations used below are conventional. The matrix forms can vary depending on the controllers involved.

In the description that follows, $X_2$ and $Y_2$ represent the matrices corresponding to $C_2$, $C_2$ being represented according to A, B, $X_1$, $Y_1$ and Q, which is the parameter of the controller calculated according to $X_2$ and $Y_2$.

Thus, the vehicle model is represented in a matrix form defined by relationship (1):

$$P_{veh}=BA^{-1}=\overline{A}^{-1}\tilde{B} \quad (1)$$

The elementary controller $C_1$ is represented in a matrix form defined by relationship (2):

$$C_1=Y_1X_1^{-1}=\tilde{X}_1^{-1}\tilde{Y}_1 \quad (2)$$

The elementary controller $C_1$ is represented in a matrix form defined by relationship (3):

$$C_2=Y_2X_2^{-1}=\tilde{X}_2^{-1}\tilde{Y}_2 \quad (3)$$

The parameterized adaptive controller 112 can then be represented by C(γ), defined by equation (4):

$$C(\gamma)=(Y_1+\gamma AQ)^{-1}(X_1+\gamma BQ) \quad (4)$$

In equation (4), the matrix Q represents a stable adaptive matrix that can be used to change over from the elementary controller $C_1$ to the elementary controller $C_2$, and conversely from the elementary controller $C_2$ to the elementary controller $C_1$, which allows a stable interpolation between the two controllers by activating a part of each elementary controller according to the value of the permutation signal γ.

The stable adaptive matrix Q can be calculated using equation (5) below:

$$Q=\tilde{X}_2(C_2-C_1)X_1 \quad (5)$$

It is worth noting that the invention is not limited to the use of two elementary controllers but applies to any number N of elementary controllers Ci (1120) with [i=1; N].

The embodiments allow a stable interpolation (that is to say a stable transition) between the elementary controllers Ci. The interpolation can be performed using an arbitrary signal adapted for selecting the appropriate controller corresponding to the real-time operating conditions. Thus, the adaptive controller 112 allows the vehicle to be adapted to the operating conditions in real time while maintaining the stability of the system (i.e. the system does not increase the output if the input received is the same or less).

Figure 8:
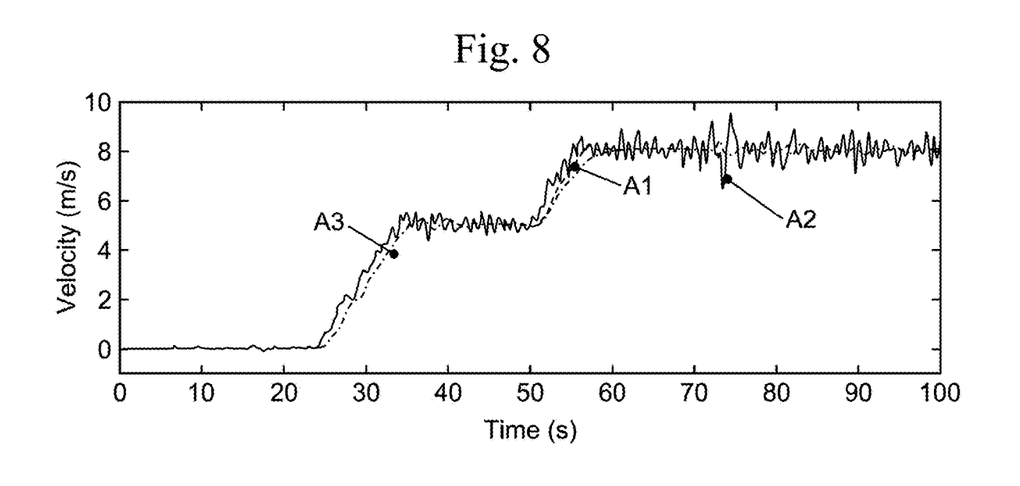
FIG. 8 illustrates the performance of the control device, according to certain embodiments of the invention.

FIG. 8 illustrates the performance of the control device 11 according to certain embodiments of the invention using a first elementary controller 1120-A of vehicle tracking controller type and a second controller 1120-B of perception noise rejection controller type. The performance is illustrated vis-à-vis a vehicle controller from the prior art using only the vehicle tracking controller 1120-A.

Figure 9:
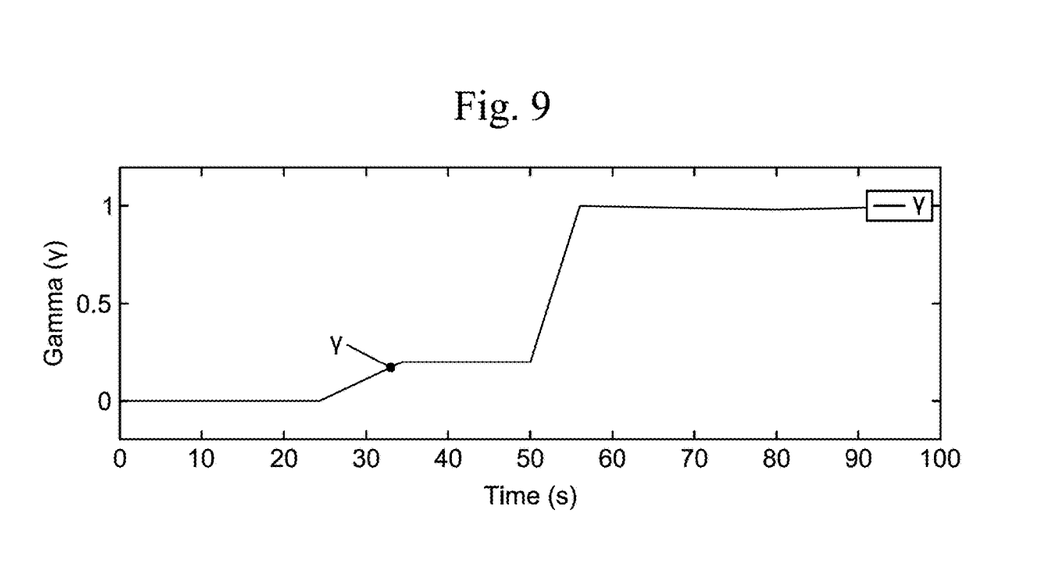
FIG. 9 illustrates the progression of the permutation signal corresponding to the embodiment.

FIG. 8 shows the velocity of the head vehicle (curve A1), the response of an adaptive regulating system ACC to the velocity changes of the head vehicle corresponding to a controller C1 realized in an ego vehicle, according to the prior art (curve A2), and the response of the controller adapted to perception 112 that is realized in an ego vehicle 1 according to some embodiments, the controller adapted to perception 112 being capable of selecting at least one of the two elementary controllers C1 and C2 according to the permutation signal γ (also called "permutation factor"), and of activating the selected elementary actuator(s) (curve A3). The controller adapted to perception 112 can thus be used to share the performance of the elementary controllers. FIG. 9 illustrates the progression of the permutation signal γ corresponding to the embodiment associated with curve A3.

It can be seen in FIG. 8 that the head vehicle 3 initially has a velocity of 0 m/s (curve A1). Its velocity then increases to 5 m/s until it reaches 8 m/s. The two elementary controllers C1 (1120-A) and C2 (1120-B) used by the adaptive controller 112, according to some embodiments (curve A3), each have different control objectives, one controlling the tracking velocity error (C1 (1120-A)) and the other controlling the noise level of the perception system (C2 (1120-B)).

As shown in FIGS. 8 and 9, the adaptive controller 112 selects at least one of the controllers C1 and C2, according to the factor γ (also called "permutation factor"):
- when the factory γ is equal to zero (γ=0), the ego vehicle 1 determines that the perception system 2 is working perfectly and without any imprecision (that is to say that the perception system 2 has optimum precision). The adaptive controller 112 then activates the first elementary controller C1, the first elementary controller C1 acting on the actuators of the vehicle in order to minimize the vehicle tracking velocity error as far as possible,
- when the factory is equal to one (γ=1), the adaptive controller 112 activates the second elementary controller C2, the second elementary controller C2 acting on the actuators of the vehicle in order to reduce the noise potentially introduced by the first elementary controller C1 by 50%.

Adaptive control of this kind compromises tracking performance only very little vis-à-vis the design, and provides a completely different but stable response.

FIGS. 8 and 9 show that when the velocity is equal to zero, there is no noise in the perception and the factor γ is equal to zero. When the velocity increases to 5 m/s, the factor γ increases to 0.2, which generates a small difference in the response of the controller C1 and of the controller adapted to perception 112. Moreover, the next velocity change takes the perception system 2 to its maximum level of imprecision (velocity of the head vehicle equal to 8 m/s). During the transition from 5 to 8 m/s, the factory γ progresses from 0.2 to 1, meaning that the contribution of the second elementary controller C2 becomes greater, as clearly illustrated by the responses A2 and A3 of the two systems between 50 and 60 seconds. The closer the velocity is to 8 m/s, the greater the difference between the response A2 (corresponding to the controller C1 according to the prior art) and the response of the controller adapted to perception 112. It should be noted that, at around 58 seconds, the tracking capabilities begin to decrease. However, the response is smoother and more robust. From 60 seconds onward and up to the end of the experimental measurements, the factor γ remains at values close to the value 1 (one), but the velocity fluctuations of the head vehicle (curve A1) make it vary slightly around the value 1.

The advantages of the controller adapted to perception 112 are even more clear at around 72 seconds, where it may be noted that the perception system 2 has significant imprecision when the velocity of the head vehicle is between 6 m/s and 10 m/s (in the tests performed, the velocity of the head vehicle is 8 m/s) within a short period of time. By using a controller C1, such imprecision is reproduced in the performance of the ego vehicle, whereas it is completely absorbed by the perception-based control system according to the embodiments of the invention.

The embodiments of the invention can thus be used to adapt the performance of the vehicle in real time depending on the imprecisions of the perception system 2, allowing very good control capabilities, such as vehicle tracking capabilities, and good disturbance rejection when required. It is therefore possible to optimize the performance of the vehicle in any situation.

The embodiments of the invention can thus be used to provide an adaptive control system 112 capable of adapting to various control objectives in real time.

The adaptive control system 1 can effectively adapt to imprecisions of the perception system (noise rejection) and adjust the response of the vehicle to a given scenario or driver.

In one exemplary embodiment, the adaptive control device 10 may be multisensor by providing a plurality of elementary controllers 1120 (more than two), each corresponding to a type of target performance, the driver being able to select the target performance according to his preferences, for example.

A multisensor function can thus be added to an ADAS- or AD-type control system, the invention being able to be used to adapt, change and parameterize the response of the control device 10 whatever the sensors. A plurality of elementary controllers 1120 can be implemented and activated/deactivated according to target criteria relating to driving comfort or user preferences.

The invention is not limited to one particular type of vehicle and applies to any type of vehicle (vehicle examples include, without limitation, automobiles, trucks, buses, etc.). Although not limited to such applications, the embodiments of the invention have a particular advantage for realization in autonomous vehicles connected by communication networks that allow them to exchange V2X messages.

A person skilled in the art will understand that the system or some subsystems according to the embodiments of the invention can be realized in different ways by way of hardware, software or a combination of hardware and software, in particular in the form of program code that can be distributed in the form of a program product, in various forms. In particular, the program code can be distributed using computer-readable media, which may include computer-readable storage media and communication media. The methods described in the present description can be in particular implemented in the form of computer program instructions executable by one or more processors in a computer computing device. These computer program instructions can also be stored in a computer-readable medium.

Moreover, the invention is not limited to the embodiments described above by way of nonlimiting example. It encompasses all realization variants that may be envisaged by those skilled in the art. In particular, a person skilled in the art will understand that the invention is not limited to particular types of sensors of the perception system 20, to a particular number or to particular types of elementary controllers.

The invention claimed is:

1. A control system for controlling a vehicle the vehicle implementing at least one control application using a magnitude measured by at least one sensor of a perception system installed on the vehicle, the control system comprising:
   an adaptive controller configured to dynamically activate, depending on a permutation signal, one or more elementary controllers of a set of elementary controllers comprising at least two elementary controllers, each elementary controller being configured to apply a control function for controlling a parameter of the vehicle by acting on actuators of the vehicle, the control functions being separate, the permutation signal having a value that varies according to a precision indicator of the perception system determined according to a real-time value of said magnitude, wherein the adaptive controller is configured to dynamically activate the one or more elementary controllers by switching between the at least two elementary controllers while the vehicle is moving.

2. The control system as claimed in claim 1, wherein the value of the permutation signal varies between a first value representing an optimum level of precision of the perception system and a second value representing a minimum level of precision of the perception system.

3. The control system as claimed in claim 2, wherein the first value is equal to one and the second value is equal to zero.

4. The control system as claimed in claim 2, wherein the elementary controllers comprise a first elementary controller and a second elementary controller, and when the precision indicator has the first value then the permutation signal is updated to a first signal value, the first controller being completely activated in response to the update of the permutation signal.

5. The control system as claimed in claim 4, wherein the first elementary controller is a vehicle tracking controller and the second elementary controller is a noise rejection controller.

6. The control system as claimed in claim 2, wherein when the precision indicator of the perception system has the second value then the permutation signal is updated to a second signal value, the second elementary controller being completely activated in response to the update of the permutation signal.

7. The control system as claimed in claim 1, wherein the magnitude is a magnitude from among a velocity of the vehicle, an inter-vehicle distance between said vehicle and a head vehicle, and a yaw velocity of said vehicle.

8. The control system as claimed in claim 1, wherein said control applications use a plurality of magnitudes measured by at least two sensors of the perception system, the adaptive controller comprising a switch for selecting a magnitude from among said magnitudes, the adaptive controller being applied to said selected magnitude by using the activated elementary controllers.

9. The control system as claimed in claim 1, wherein the adaptive controller configured to dynamically activate both of the at least two elementary controllers in response to the value of the permutation signal.

10. A control method for controlling a vehicle that is carried out in said vehicle, the vehicle implementing at least one control application using a magnitude measured by at least one sensor of a perception system installed on the vehicle, the method comprising:
    selecting at least one elementary controller, depending on a permutation signal, from among a set of elementary controllers comprising at least two elementary controllers, each elementary controller being configured to apply a control function for controlling a parameter of the vehicle by acting on actuators of the vehicle, the control functions being separate, the permutation signal having a value that varies according to a precision indicator of the perception system determined according to a real-time value of said magnitude; and
    activating said at least one selected elementary controller, including switching between the at least two elementary controllers while the vehicle is moving.

11. The control method as claimed in claim 10, wherein activating includes activating both of the at least two elementary controllers in response to the value of the permutation signal.

* * * * *